Patented April 20, 1971

INVENTORS
DONALD M. McDOWELL &
FRANK W. HORNER, JR.

BY Pennie, Edmonds, Morton, Taylor & Adams

ATTORNEYS

United States Patent

[11] 3,575,397

[72] Inventors Donald M. McDowell
Allentown;
Frank W. Horner, Jr., Bethlehem, Pa.
[21] Appl. No. 3,280
[22] Filed Jan. 16, 1970
[45] Patented Apr. 20, 1971
[73] Assignee Fuller Company

[54] KILN SEAL
8 Claims, 8 Drawing Figs.

[52] U.S. Cl. .................................................. 263/32,
34/242
[51] Int. Cl. .................................................. F27b 7/20,
F26b 25/00
[50] Field of Search .......................................... 263/32, 33;
34/242

[56] References Cited
UNITED STATES PATENTS
2,469,078  5/1949  Robison ................... 263/33

2,517,470  8/1950  Erisman ................... 34/242X
3,532,330  10/1970  Swanson ................... 263/32

Primary Examiner—John J. Camby
Attorneys—Jack L. Prather and Donald R. Comuzzi

ABSTRACT: A sealing assembly for sealing the opening between the communicating members of a rotary furnace system, more particularly for sealing between a rotating member such as a kiln or dryer shell and a stationary member such as a fire hood or feed end housing, comprising a plurality of abradable sealing blocks in sliding engagement with the rotating member and guide means positioned between the sealing blocks and in slidable engagement therewith, the sidewalls of the individual sealing blocks being parallel in relation to each other and the sidewalls of the guide means being in a parallel relation with the opposed sidewalls of the sealing blocks and converging in a downward direction and terminating at a point above the surface of the rotating member.

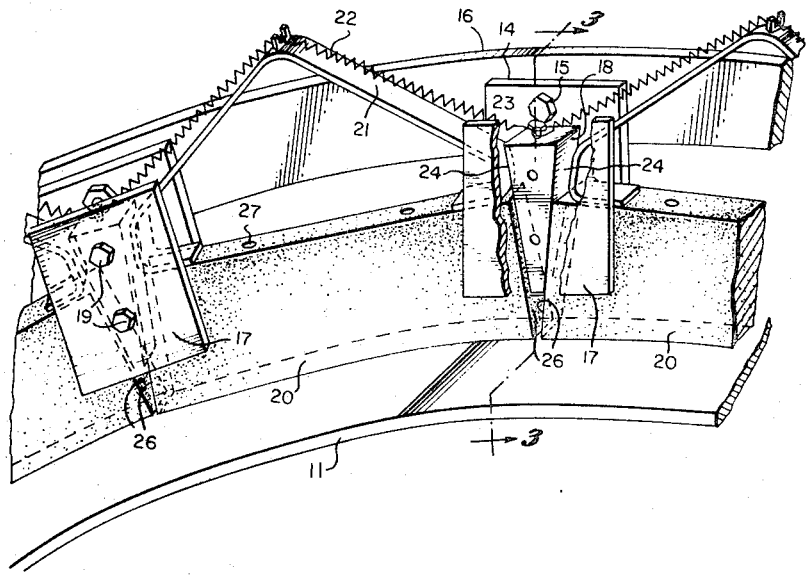

Patented April 20, 1971

INVENTORS
DONALD M. McDOWELL &
FRANK W. HORNER

BY
Pennie, Edmonds, Morton, Taylor & Adams
ATTORNEYS

KILN SEAL

BACKGROUND OF THE INVENTION

Heretofore rotary furnace systems have not been able to satisfactorily limit the ingress or egress of air, gases and the like from the joining area between the rotating and stationary portions of the furnace. Moreover, such sealing devices as are presently used are difficult and costly to maintain and repair.

Previous seals have included complex interengaging metal (iron or steel) members in the form of heavy castings or fabrications, usually spring-biased or lever-biased against each other and their respective mountings. Variations have included combinations with gasketing or air or water cooling. Another form of seal has included flexible metal plates secured to the stationary housing and slidably engaging the rotating shell.

Maintenance and repair of such seals are difficult due to the cumbersome nature of the seal components, which may have diameters of 12 feet, or more, as well as the complexity of aligning the interengaging members. Also, due to the very high temperatures encountered in rotary furnaces, it is usually necessary to close down the furnace in order to repair or replace any portion of the seal.

Further, there is often eccentricity in the shell of a rotary furnace with resultant eccentric grinding between the metal wear plates on the seal and the shell of the furnace. This further aggravates the problem of maintaining a good seal and shortens the time between closing down of the apparatus to replace worn parts of the seal. Typical of these prior art seals is that disclosed in U.S. Pat. No. 2,882,613. Inspection shows that after only slight wear the seal members of this device will abut at their ends and a leakage gap for air and gas formed which is equal to the runout of the kiln shell. The seal members will cease to follow the kiln shell and must be replaced after but short wear.

SUMMARY OF THE INVENTION

The present invention provides sealing assemblies for rotary furnaces, and in particular rotary kilns and rotary dryers which form a more perfect seal and which minimize maintenance and repair by providing for replacement of worn sealing elements without shutdown of the kiln or dryer.

Briefly stated, the present invention comprises a sealing assembly comprising a plurality of abradable sealing blocks extending circumferentially about a cylindrical member communicating with a second member, means attached to the second member for confining the sealing blocks so as to prevent any substantial axial movement thereof while permitting radial movement of the sealing blocks, means for urging the sealing blocks to move radially towards said cylindrical member to maintain a sliding contact therebetween, and guide means positioned between the sealing blocks, the sidewalls of the individual sealing blocks being in parallel relation to each other and the sidewalls of the guide means being in parallel relation with the opposed sidewalls of the sealing blocks and converging in a downward direction and terminating at a point above the surface of the cylindrical member. In one embodiment of the invention, the sealing blocks are confined in such a manner so as to permit the adding of a replacement sealing block atop an original sealing block for subsequent feeding into sealing contact with the cylindrical member when the original block is worn away.

BRIEF DESCRIPTION OF THE DRAWINGS

A better understanding of the invention may be derived from the following description, reference being had to the accompanying drawings of the embodiments of the invention in which.

DETAILED DESCRIPTION

The invention will be described in connection with a rotary kiln, it being understood that it is suitable for use in other apparatus where it is desired to limit the entry or exit of gases and other like material from the joining area between a rotating and stationary member.

Figure 1:
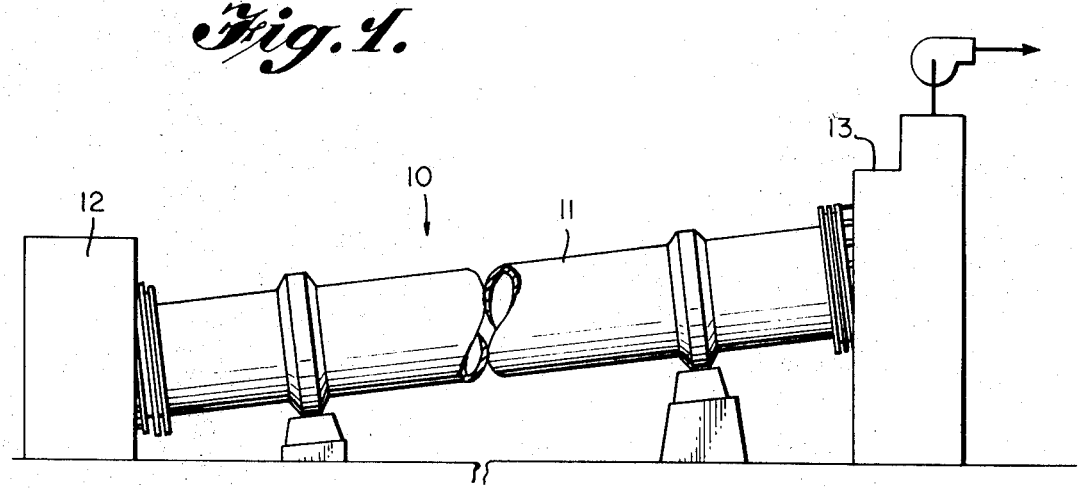
FIG. 1 is a schematic side elevational view of a rotary kiln utilizing the sealing assembly of the instant invention.

In FIG. 1 there is shown a rotary kiln 10 comprising a rotating shell 11 which extends into a fire hood 12 and a feed end housing 13.

Figure 2:
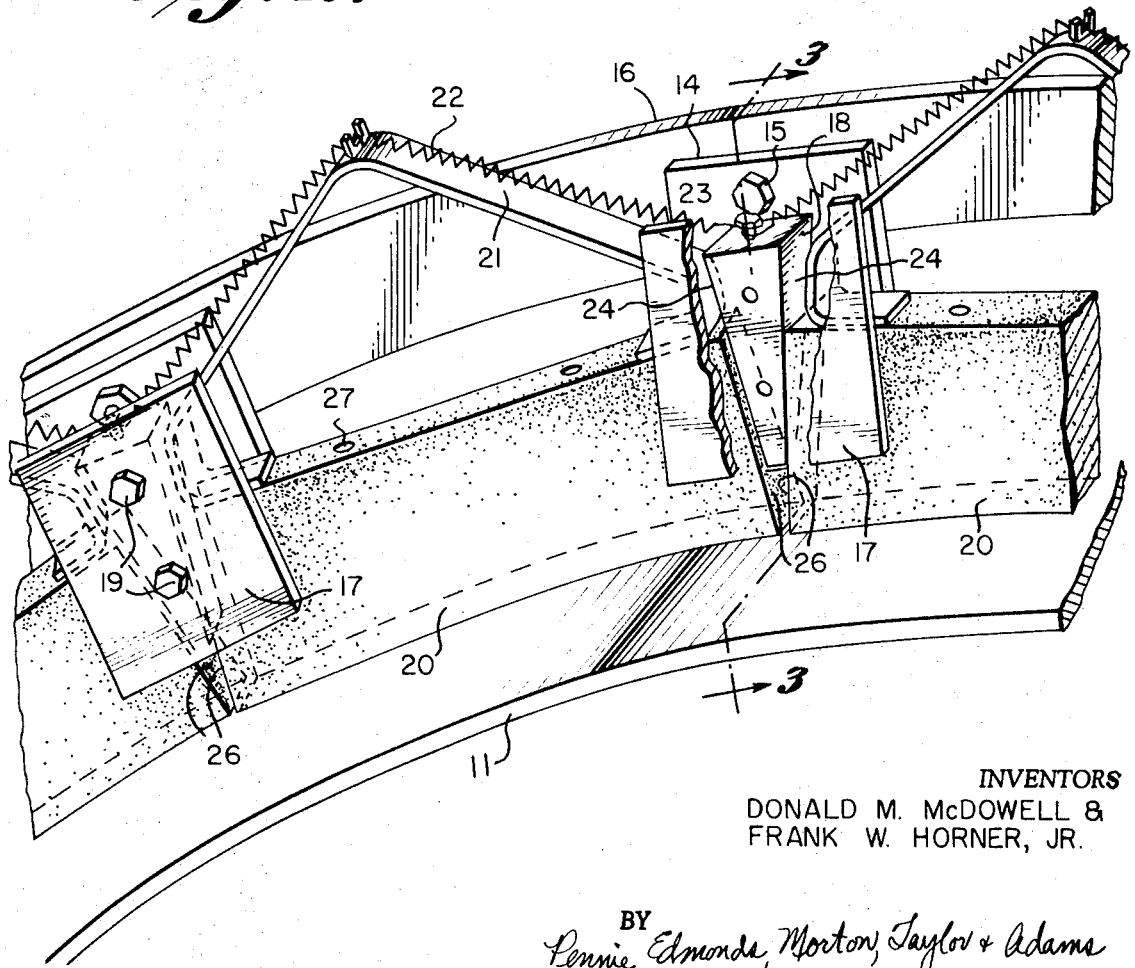
FIG. 2 is a fragmentary perspective view of a portion of the sealing assembly.
Figure 3:
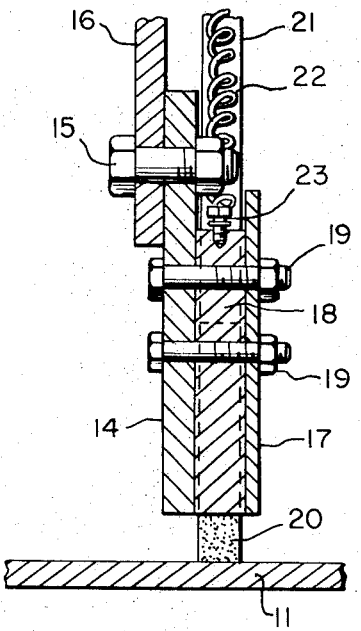
FIG. 3 is a vertical sectional view taken along line 3-3 of FIG. 2.

Referring to FIGS. 2 and 3, there is shown a portion of the sealing assembly of the instant invention. A rear seal plate 14 is fastened, as by means of a nut and bolt 15, to the stationary ring portion 16 of the feed end housing 13 of the kiln. The kiln shell 11 extends into the feed end housing 13 beyond the ring 16.

Spaced apart from and mounted to the rear seal plate is the front seal plate 17. In the preferred embodiment of this invention guide means 18, as hereinafter described, are fastened between the front and rear seal plates. Nuts and bolts 19 are used to mount the front seal plate 17 and guide means 18 to the rear seal plate 14, although it will be evident that other equivalent fastening means can be used. The space between the front and rear seal plates is regulated to permit free radial movement of sealing blocks 20 housed therebetween, but to prevent any substantial axial movement thereof.

The sealing blocks 20 are made of a relatively heat-resistant abradable material, preferably graphite. Graphite is preferred because it is self-lubricating and minimizes heat evolved by the frictional contact between the blocks 20 and shell 11 as described below.

A triangular-shaped spring support 21 sits on the upper surface of each block 20. A spring 22 is removably mounted to the top of each support 21 and the spring ends attached to the guide means 18 by means of screws 23. The springs act to urge the supports 21, and consequently the blocks 20, radially to the kiln shell 11. While a series of springs 22 have been illustrated, a single spring about the entire circumference of the shell 11 can be used. The tension of the springs is adjusted to insure that sufficient force is exerted on the blocks 20 to keep them in sliding contact with the rotating kiln shell 11.

The guide means 18 consist of a nonabradable wedge-shaped block made of metal such as steel, whose sidewalls 24 converge downwardly and terminate at a point above the upper surface of the shell 11. As described, it is preferred to fasten the guide means 18 between the front and rear seal plates and accordingly it also serves the function of spacing the front seal plate 17 from the rear plate seal plate 14 the necessary distance to permit the free radial movement of the sealing blocks 20 housed between the seal plates 14 and 17. The primary function of the guide means 18 is to keep the blocks 20 spaced apart from each other so as to prevent them from binding and not maintaining a sliding contact with the kiln shell 11.

Figure 7:
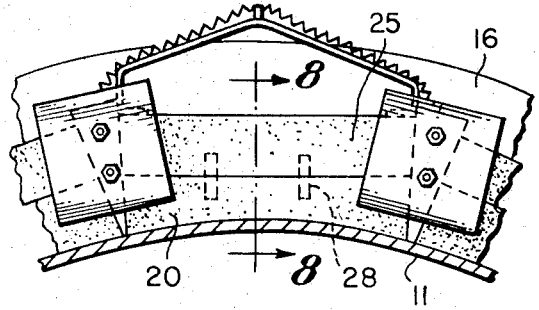
FIG. 7 is a fragmentary view showing a replacement seal block attached to a worn block.
Figure 8:
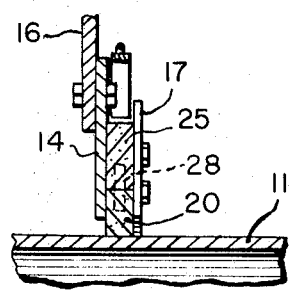
FIG. 8 is a fragmentary sectional view taken along line 8-8 of FIG. 7.

There is, however, a further relationship between the blocks 20 and guide means 18 which permits the addition of a replacement block 25 atop an original sealing block 20 as illustrated in FIGS. 7 and 8. Specifically, the sidewalls 26 of each individual block 20 are in parallel relation to each other and each of the sidewalls 24 of the guide means 18 are in parallel relation to the respective opposing sidewall 26 of the block 20. Moreover, the angle of convergence of the sidewalls 24 of the guide means 18 is such that if the sidewalls were extended they would meet at a line at about the surface of the shell 11. The sealing blocks 20 are thereby kept from binding engagement at the surface of the shell 11 and, equally importantly, a replacement block 25 of the same width as the original block 20 can be included in the sealing assembly without any need to disassemble or move the seal plates 14 and 17, the guide means 18, or the original block 20. The spring 22 is simply removed from the support 21, the support 21 lifted from block 20 and the replacement block 25 housed between seal plates 14 and 17 atop the original block 20. The support 21 is then placed on the replacement block 25 and the spring 22 remounted on the support 21.

The original sealing block 20 and replacement block 25 may be provided with pockets 27 for reception of dowel pins 28. The dowel pins 28, preferably made of an abradable material such as carbon, act to lock the two blocks together. As the original block is worn away and the replacement block comes into sliding contact with the shell 11, the dowel pins 28 will also become abraded and worn away without adversely affecting the seal between the block 25 and shell 11.

Figure 4:
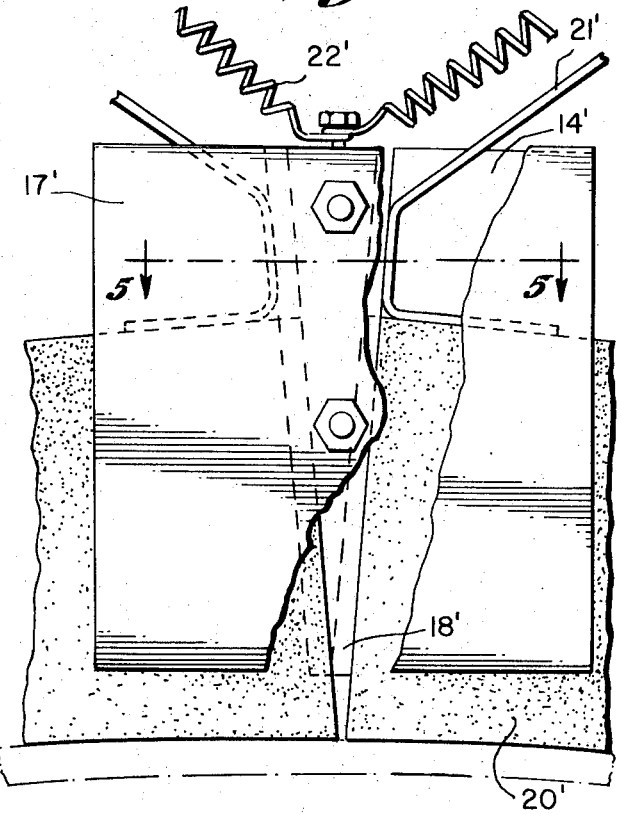
FIG. 4 is a front fragmentary elevational view of an alternate embodiment of the invention in which a lapped wedge construction is used.
Figure 5:
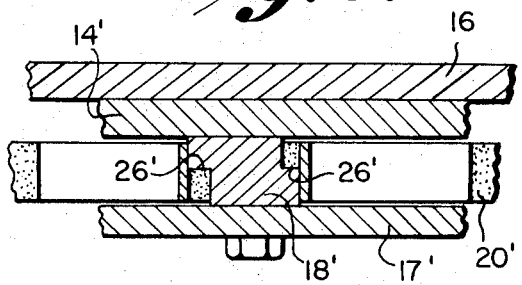
FIG. 5 is a fragmentary sectional view taken along line 5-5 of FIG. 4.
Figure 6:
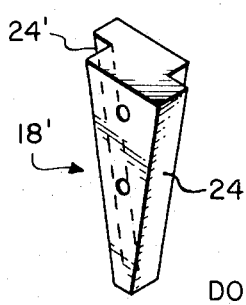
FIG. 6 is a perspective view of a lapped wedge.

An alternate embodiment of the invention is illustrated in FIGS. 4, 5 and 6, wherein a ship-lap joint is formed between the sidewalls 24' of guide means 18' and the sidewall 26' of the sealing block 20'. This type of joint provides a better seal against possible ingress or egress of gaseous materials through the joining area between the rotating and stationary members. Here again, the relationship of the sidewalls 26' of the sealing block 20' with each other and with the sidewalls 24' of guide means 18' is the same as that previously described, as is the angle of convergence of the sidewalls 24' of guide means 18'. The front seal plate 17', rear seal plate 14', spring support 21' and spring 22' are as described above with reference to FIGS. 1—3.

The operation of the sealing assembly is largely evident from the description given above. The spring 22 and its support 21 act to urge the blocks 20 into sliding contact with the shell 11. As the blocks 20 become worn, replacement blocks 25 may be added atop the original blocks 20 as described. The action of the spring 22 and support 21 will feed the replacement blocks 25 into sealing contact with the shell 11 when the original block 20 is completely worn away. The relationship between the blocks 20 and guide means 18 as set forth above permits this replacement and also prevents binding of the individual blocks 20, or their replacements, with each other. The sealing plates 14 and 17 and guide means 18 are spaced a sufficient distance above the shell 11 to prevent any contact therewith.

While the sealing assembly of the instant invention has been described as being mounted on a stationary member, it can be mounted on a rotating member so long as the blocks 20 are in sliding contact with an essentially cylindrical surface. Thus, for example, the sealing assembly can be affixed to the rotating annular cover plate of a rotary kiln drum and the sealing blocks 20 maintained in sliding contact with the stationary smoke box extension, as described in U.S. Pat. No. 2,882,613. Also, biasing means, such as removable lever-biasing means, can be utilized in place of the spring-biasing means.

All parts of the assembly, with the exception of the sealing blocks, are constructed of wear and heat-resistant materials, preferably metals such as iron or steel.

It will be understood that it is intended to cover all changes and modifications of the disclosure of the invention herein chosen for the purpose of illustration which do not constitute departures from the spirit and scope of the invention.

We claim:

1. A sealing assembly for sealing the opening between two communicating members, at least one of which is cylindrical and at least one of which rotates, comprising a plurality of abradable sealing blocks extending circumferentially about a cylindrical communicating member, means attached to the other communicating means for confining the sealing blocks so as to prevent any substantial axial movement thereof while permitting radial movement of the sealing blocks, means for urging the sealing blocks to move radially towards said cylindrical communicating member to maintain a sliding contact between the sealing blocks and said member, and guide means positioned between the sealing blocks, the sidewalls of the individual sealing blocks being in parallel relation to each other and the sidewalls of the guide means being in parallel relation with the opposed sidewalls of the sealing blocks and converging in a downward direction and terminating at a point above the surface of the cylindrical communicating member.

2. The assembly of claim 1 wherein the cylindrical communicating member is a rotary kiln or dryer shell, the other communicating member is a stationary fire hood or free end housing, the abradable sealing blocks are constructed of a low friction, relatively heat-resistant material, the confining means comprise front and rear seal plates mounted to said stationary member and spaced apart from each other to permit radial movement of said sealing blocks placed therebetween, the urging means comprise a spring-biased assembly in contact with the upper surface of said sealing blocks, and the guide means are wedges attached to the stationary member between said front and rear seal plates.

3. The assembly of claim 2 wherein the cylindrical communicating member is a rotary kiln shell, the other communicating member is a fire hood into which the rotary kiln shell extends, the abradable sealing blocks are of graphite and are mounted between the front and rear seal plates, the spring-biased assembly comprises triangular-shaped followers positioned on said sealing blocks and springs removably mounted on said followers, and said wedges and sealing blocks are in sliding contact with each other.

4. The assembly of claim 3 wherein the sealing blocks have at least one pocket in their upper surface for the reception of means to lock replacement sealing blocks onto the top of said sealing blocks.

5. The assembly of claim 4 wherein said locking means is an abradable dowel pin housed in said pocket.

6. The assembly of claim 3 wherein the contacting sidewalls of said wedges and sealing blocks are ship-lapped to form ship-lapped joints.

7. The assembly of claim 4 wherein the contacting sidewalls of said wedges and sealing blocks are ship-lapped to form ship-lapped joints.

8. The assembly of claim 6 including at least one replacement sealing block mounted on at least one sealing block and attached thereto by means of at least one abradable dowel pin extending between pockets in said replacement block and said sealing block.